United States Patent [19]

Morris et al.

[11] Patent Number: 5,049,324
[45] Date of Patent: Sep. 17, 1991

[54] METHOD OF MAKING A FURNACE LINING WITH A FIBER FILLED RETICULATED CERAMIC

[75] Inventors: Jeffrey R. Morris, Scio; William E. Meinking, Alfred Station, both of N.Y.

[73] Assignee: Hi-Tech Ceramics, Inc., Alfred Station, N.Y.

[21] Appl. No.: 387,076

[22] Filed: Jul. 28, 1989

Related U.S. Application Data

[63] Continuation-in-part of Ser. No. 137,192, Dec. 23, 1987, abandoned.

[51] Int. Cl.$^5$ .................. B32B 35/00; C04B 35/71; C04B 41/81; F27D 1/16
[52] U.S. Cl. .................. 264/30; 264/36; 264/44; 264/60; 264/112
[58] Field of Search .................. 264/30, 36, 44, 60, 264/112; 428/304.4, 307.3, 307.7, 309.9, 310.5, 311.1, 311.5, 312.2, 312.6, 312.8, 317.9, 699, 79

[56] References Cited

U.S. PATENT DOCUMENTS

| | | | |
|---|---|---|---|
| Re. 32,603 | 2/1988 | Brockmeyer | 264/44 |
| 3,090,094 | 5/1963 | Schwartzwalder et al. | 264/44 |
| 3,451,841 | 6/1969 | Keston et al. | 428/312.8 |
| 3,632,385 | 1/1972 | Schmitt et al. | 264/44 X |
| 3,686,006 | 8/1972 | Horton | 264/44 X |
| 3,972,834 | 8/1976 | Washbourne | 501/84 X |
| 4,083,905 | 4/1978 | Insley et al. | 264/44 X |
| 4,120,641 | 10/1978 | Myles | 264/30 X |
| 4,123,886 | 11/1978 | Byrd, Jr. | 264/30 X |
| 4,244,761 | 1/1981 | Remi et al. | 264/30 X |
| 4,251,239 | 2/1981 | Clyde et al. | 55/132 |
| 4,264,346 | 4/1981 | Mann | 428/312.8 |
| 4,401,613 | 8/1983 | Abell et al. | 264/30 X |
| 4,443,509 | 4/1984 | Sauder | 264/30 X |
| 4,446,082 | 5/1984 | Harvey et al. | 264/30 |
| 4,568,595 | 2/1986 | Morris | 428/116 |
| 4,697,632 | 10/1987 | Lirones | 264/44 X |
| 4,746,287 | 5/1988 | Lannutti | 264/44 X |
| 4,866,011 | 9/1989 | Hargus et al. | 264/44 X |

FOREIGN PATENT DOCUMENTS

| | | | |
|---|---|---|---|
| 275864 | 6/1964 | Australia | 428/317.9 |
| 752911 | 2/1967 | Canada | 264/44 |
| 59-162168 | 9/1984 | Japan | 428/312.8 |
| 0081317 | 5/1985 | Japan | 264/44 |
| 0195076 | 10/1985 | Japan | 264/44 |
| 0251182 | 12/1985 | Japan | 264/44 |
| 1106468 | 5/1986 | Japan | 264/44 |
| 1106471 | 5/1986 | Japan | 264/44 |
| 62-30038 | 2/1987 | Japan | 428/307.3 |
| 916784 | 1/1963 | United Kingdom | |

Primary Examiner—Jan H. Silbaugh
Assistant Examiner—Karen Aftergut
Attorney, Agent, or Firm—Webb, Burden, Ziesenheim & Webb

[57] ABSTRACT

A method of making an insulating furnace lining by forming a reticulated ceramic having interconnected webs defining a plurality of interconnected pores and a plurality of fibers distributed within substantially all of the pores in a selected volume of the reticulated ceramic. The reticulated ceramic is arranged to form at least a portion of a furnace lining. The reticulated ceramic and the fibers may be oxides, ceramics, carbides, nitrides, silicides, borides, carbon and mixtures thereof. The fibers form a batt which fills at least a portion of the pores.

14 Claims, No Drawings

METHOD OF MAKING A FURNACE LINING WITH A FIBER FILLED RETICULATED CERAMIC

RELATED APPLICATION

This application is a continuation-in-part of U.S. application Ser. No. 07/137,192, filed Dec. 23, 1987, now abandoned.

BACKGROUND OF THE INVENTION

Reticulated ceramics, in other words, sintered ceramic foams, comprise a solid phase that is interspersed in a continuous pore phase extending in all directions. The solid phase comprises relatively inert ceramic materials (high temperature resistant, inorganic materials, usually oxides, carbides, etc.). Methods of producing reticulated ceramics are disclosed in U.S. Pat. No. 4,568,595 and elsewhere. In U.S. Pat. No. 4,251,239, it is taught to provide, within the reticulated ceramic, a plurality of passages of a predetermined definable pattern and partially or completely fill the passages with fine filtering materials such as ceramic fibers.

Reticulated ceramics have numerous uses such as insulating furnace linings, heat exchange media, and filters for hot liquids including molten metals.

SUMMARY OF THE INVENTION

The inventions disclosed in this patent application relate to novel fiber filled reticulated ceramics which, when used as an insulating furnace lining, have advantages not contemplated for reticulated ceramics. The fiber filled reticulated ceramics, according to this invention, combine the high heat insulating properties and thermal shock resistance properties of fibrous materials with the rigidity and other mechanical properties of monolithic ceramics. The fiber filled reticulated ceramics have better high temperature creep resistance than a fibrous board or blanket. They are stronger and self-supporting and thus do not require support arrangements. They are more abrasion resistant. They have improved dimensional stability at upper use temperatures with less tendency for bulk shrinkage and cracking.

One advantage of fiber filled reticulated ceramics is that they can be easily tailored to have specific permeabilities, heat conductivities, porosities and effective mesh sizes by altering the degree of fiber loading.

Briefly, according to this invention, there is provided a method of insulating a furnace comprising forming a dimensionally stable reticulated ceramic consisting of interconnected webs defining a plurality of interconnected pores and a plurality of fibers distributed within substantially all of said pores and arranging the reticulated ceramic to form at least a portion of a furnace lining. Preferably, the reticulated ceramic and the fibers are oxide ceramics, carbides, nitrides, silicides, borides, carbon or mixtures thereof. The fibers form a batt filling substantially all of said pores in a selected volume of the reticulated ceramic. In one specific embodiment, substantially all of said pores are filled. In another specific embodiment, the fibers form a batt filling pores adjacent a surface of the lining but do not fill all pores of the construct. The fibers may be unattached or they may be chemically or ceramically bonded to each other, to the reticulated ceramic, or to both. The fibers may be at least partially coated with equiaxed ceramic particles, especially where they are ceramically bonded.

Preferredly, the bulk density of the reticulated ceramic is between 3 and 50 percent and the bulk density of the fiber filled pores is between 1 and 50 percent. The apparent density of the fiber filled pores is typically between 0.05 and 2.25 grams per cubic centimeter. Preferredly, the average effective diameter of the pores in the reticulated ceramic ranges from 10 microns to 2500 microns, the average length of the fibers ranges to 10 cm and the aspect ratio (width/length) of the fibers exceeds 10.

In embodiments in which the fibers form a continuous batt throughout the pores, the fibers may have an average length of at least 80 percent of the effective average diameter of the pores.

Most preferredly, the reticulated ceramic is an oxide ceramic comprised of lithium-alumino-silicates, alumino-silicates, aluminas, partially stabilized zirconias, fully stabilized zirconias, cordierites, mullites, and mixtures thereof or the reticulated ceramic is comprised of SiC, $Si_3N_4$, $B_4C$, AlN and sialons. Most preferredly, the fibers are alumina silicate fibers, high alumina fibers, zirconia fibers, non-oxide ceramic fibers, carbon fibers and mixtures thereof.

There is also provided, according to this invention, a method of forming a fiber filled reticulated ceramic comprising the steps of a) forming a reticulated ceramic, b) forming a slurry of fibers, and c) flushing the slurry into the reticulated ceramic until the desired fiber loading is achieved. The flushing of the slurry into the reticulated ceramic may be assisted by pressurizing the slurry, pulling a vacuum upon the reticulated ceramic and/or vibrating the reticulated ceramic. The slurry of fibers may comprise 1 to 80 volume percent fibers dispersed in a liquid. The slurry may comprise equiaxed ceramic powder and fibers such that the fibers are at least partially coated with equiaxed ceramic particles. In one embodiment, a further step comprising firing the fiber filled reticulated ceramic such that the fibers are ceramically bonded to the surface of the pores, to each other, or both. In another embodiment, the slurry comprises, in addition to the fibers, a chemical binder such that the fibers are chemically bonded to the surface of the pores, to each other, or both.

DESCRIPTION OF THE PREFERRED EMBODIMENTS

A reticulated ceramic may be formed by immersing an open-celled, porous, organic material (for example, urethane foam) in a slurry of finely divided ceramic powder having a binder therein. In this way, the walls of the porous material are coated. Excess slurry is removed. The coated material is then fired to burn out the organic material and immediately or thereafter fired to form a ceramic bond (sintered bond) between the finely divided ceramic particles. In this way, the internal structure of the porous material is replicated. See, for example, U.S. Pat. No. 3,090,094 and British Patent No. 916,784. Table 1 sets forth the type of ceramic materials that may be used in the fabrication of a reticulated ceramic to be used in this invention and Table II sets forth specific chemistries of exemplary materials suitable for the practice of this invention.

TABLE I

A. Lithium alumino silicates (LAS, Beta-Spodumene, etc.)
B. Alumina silicates (Mullite, etc.)
C. Aluminas (92% $Al_2O_3$, 99.5% $Al_2O_3$, etc.)

D. Partially stabilized zirconias (PSZ(Mg), PSZ(Y), etc.)
E. Fully stabilized zirconias (FSZ(Ca), FSZ(Ce), etc.)
F. Non-Oxides (SiC, $Si_3N_4$, etc.)
G. Cordierites
H. Toughened ceramics (Zirconia toughened alumina (ZTA), Zirconia toughened mullite (ZTM), etc.)

TABLE II

| A. LAS | $Li_2O$: | 18.0% | $Al_2O_3$ | 13.0%, | $SiO_2$: 69% |
|---|---|---|---|---|---|
| B. Mullite | $Al_2O_3$: | 65.0%, | $SiO_2$: | 35.0% | |
| C. 92% $Al_2O_3$ | $Al_2O_3$: | 92.0%, | $SiO_2$: | 8.0% | |
| D. 99.5% $Al_2O_3$ | $Al_2O_3$: | 99.5%, | $SiO_2$: | 0.5% | |
| E. PSZ (Mg) | $ZrO_2$: | 97.0%, | MgO: | 3.0% | |
| F. FSZ (Ca) | $ZrO_2$: | 94.5%, | CaO: | 55.0% | |
| G. ZTA | $ZrO_2$: | 21.0%, | $Al_2O_3$: | 79.0% | |
| H. SiC | SiC: | 90.0%, | Si: | 10.0% | |

The average reticulate cell size to be infiltrated with the fibrous material will range between 10 and 2500 $\mu m$. Fiber length will range between 5 $\mu m$ and 10cm. The desired fiber length is obtained by chopping (longer lengths) or by milling (shorter lengths). Chopping can be accomplished through the use of a device similar to a paper cutter or through the use of a high shear blender. Milling is carried out in any of the standard manners including wet or dry ball milling. Typically, the longer the milling time, the shorter the fiber length.

The fiber is dispersed in a liquid medium (water, alcohol, etc.) using a stir-type mixer. Surfactants (dispersing agents, wetting agents, and defoamers) are added to the fiber/liquid dispersion to stabilize the suspension. A binder such as polyvinyl alcohol may be added if additional green strength of the fiber/reticulated ceramic composite is desired.

The solids content of a typical dispersion is 3%, but could range from 1% to 80%. The preformed reticulated ceramic is backed by a porous medium with a pore size less than the fiber length being utilized. This acts to prevent the fibers from being flushed through the reticulate during infiltration. In the simplest case, the fiber/liquid dispersion is poured through the reticulated ceramic allowing gravity and the porous medium to extract the liquid and to retain the fibers and thus fill the voids of the reticulated ceramic. The composite is then dried.

Variations on this procedure include drawing a vacuum on the back side of the reticulated ceramic to aid in the removal of the liquid and in creating a denser fiber packing arrangement. The fiber suspension can also be pumped through the reticulated ceramic and the pressure varied to achieve the final fiber packing density desired. Vibration may be applied to aid the fiber in moving through the reticulated ceramic for increased uniformity of the fiber distribution.

Table III sets forth the type of fibers that may be used according to the practice of this invention and Table IV sets forth specific chemistries for exemplary fibers suitable for the practice of this invention.

TABLE III

A. Alumina silicate fibers ($Al_2O_3 \cdot xSiO_2$, etc.)
B. High alumina fibers (silica bonded alumina, etc.)
C. Zirconia fibers (FSZ(Y), etc.)
D. Non-oxide fibers (SiC, $Si_3N_4$, etc.)
E. Carbon fibers

TABLE IV

| A. Transition $Al_2O_3$ | $Al_2O_3$: | 96.0% | $SiO_2$: | 4.0% |
|---|---|---|---|---|
| B. $Al_2O_3$ | $Al_2O_3$: | 99.5% | $SiO_2$: | 0.5% |
| C. Silicon Carbide | SiC: | 100.0% | | |
| D. Silicon Nitride | $Si_3N_4$: | 100.0% | | |
| E. FSZ (y) | $ZrO_2$: | 92.0% | $Y_2O_3$: | 8.0% |
| F. Carbon | C: | 100.0% | | |
| G. Alumina Silica | $Al_2O_3$ | 58.0% | $SiO_2$: | 42.0% |

Any combination of the above-disclosed reticulated ceramics and fibers can be employed to tailor the final desired properties of the fiber filled reticulate ceramic construct. Preferential fiber placement (surface vs. interior of the pores of the reticulated ceramic) is accomplished by choosing a fiber length which approaches the reticulate cell size. Thus, during infiltration, the fiber binds the surface of the reticulate preventing additional fiber from penetrating the interior regions. Fiber lengths larger than the cell size are employed to form a matt within and on the surface of the reticulate.

Infiltration may be carried out in the unfired or fired state of the reticulated ceramic. In addition, the ceramic/fiber composite may have a surface coating applied to rigidize the structure. This improves the resistance to erosion by high velocity gases associated with, but not limited to, gas fired furnaces. See U.S. Pat. No. 4,568,595.

Equiaxed particulate or ceramic precursor additions may also be made to the fiber suspension. This addition aids in the bonding to the fibrous regions. The ceramic/fiber composite may be fired to bond the fiber, react any additives, remove organic binders and expel any volatiles. Composites constructed in the unfired state are fired to consolidate the structure thereby producing denser reticulated ceramic/fiber materials.

The unit density and porosity of a reticulated ceramic structure refers to the material in bulk form as opposed to the density and porosity of the material which comprises the bulk form. In general, when referring to the bulk properties of reticulated ceramics, the unit density or mass/volume ($g/cm^3$) is reported as some percentage of the theoretical density. The theoretical density is that property of the ceramic as if it were a solid mass with no void space. The unit porosity or void space of the reticulated structure is also given by a percentage.

For this invention, reticulated ceramics with unit densities of 3% to 50% of theoretical density and unit porosities of 50% to 97% void space would be applicable.

SPECIFIC EXAMPLE

Following the procedures outlined above, a fiber filled reticulated ceramic was prepared to have the properties described in the following Table V.

TABLE V

| Reticulate size | 9" × 9" × ½" |
|---|---|
| Reticulate chemistry | 92% $Al_2O_3$: 8% $SiO_2$ |
| Reticulate unit density | 15% |
| Reticulate unit porosity | 85% |
| Reticulate cell size | 1500 $\mu m$ mean |
| Fiber chemistry | Alumina Silicate |
| Fiber length | 250 $\mu m$ |
| Infiltration method | Gravity |
| Fiber packing density | 0.72 $g/cm^3$ |

SPECIFIC APPLICATION-FURNACE LINING

One specific example of the fiber filled reticulated ceramic described above is as a furnace lining for a furnace heated to temperatures up to 1550° C. The reticulated ceramic is self-supporting. Therefore, it can be used on walls and ceilings of the furnace which are exposed to the interior. Moreover, the fiber filled reticulated ceramic has sufficient strength and abrasion resistance to be used on the floor of the furnace which supports the workpieces within the furnace. The fiber filled reticulated ceramic combines the insulation value and thermal shock resistance of fibrous materials with the mechanical advantages of monolithic ceramic shapes. Thus, it is particularly suitable as for use as a furnace lining.

Having thus described our invention with the detail and particularity required by the Patent Laws, what is claimed and desired to be protected by Letters Patent is set forth in the following claims.

What is claimed is:

1. A method of lining at least a portion of a furnace comprising forming a dimensionally stable, self-supporting reticulated ceramic structure having a plurality of interconnected webs defining a plurality of interconnected pores, loading each of said pores with fibers to provide a high loading of between 0.05 and 2.25 grams per cubic centimeter of said fibers in said pores thereby forming a fiber filled reticulated ceramic structure, and arranging said fiber filled dimensionally stable reticulated ceramic structure as a lining for said portion of said furnace thereby providing the desired thermal conductivity.

2. A method according to claim 1 wherein said reticulated ceramic structure and said fibers are selected from the group consisting of oxides, ceramics, carbides, nitrides, silicides, borides, carbon and mixtures thereof.

3. A method according to claim 1 wherein said fibers are at least partially coated with equalized ceramic particles.

4. A method according to claim 1 wherein said fibers are ceramically bonded to the surface of said webs defining said pores.

5. A method according to claim 4 wherein said fibers are ceramically bonded to each other and to said surface of said webs defining said pores.

6. A method according to claim 1 wherein said fibers are chemically bonded to the surface of said webs defining said pores.

7. A method according to claim 6 wherein said fibers are chemically bonded to each other and said surface of said webs defining said pores.

8. A method according to claim 1 wherein the bulk density of said reticulated ceramic is between 3 and 50 percent of theoretical density.

9. A method according to claim 1 wherein the bulk density of said fiber-filled pores is between 1 and 50 percent.

10. A method according to claim 1 wherein the average effective diameter of said pores in said reticulated ceramic structure ranges from 10 microns to 2500 microns and the average length of sad fibers ranges up to 10 cm.

11. A method according to claim 1 wherein said fibers have an average length of at least 80 percent of the effective average diameter of said pores.

12. A method according to claim 1 wherein said reticulated ceramic structure is an oxide selected from the group consisting of lithium-alumino-silicates, alumino-silicates, aluminas, partially stabilized zirconias, fully stabilized zirconias, cordierites, mullites, and mixtures thereof.

13. A method according to claim 11 wherein said reticulated ceramic structure is selected from the group consisting of SiC, $Si_3N_4$, $B_4C$, AlN and sialons.

14. A method according to claim 11 wherein said fibers are selected from the group consisting of alumino-silicate fibers, high alumina fibers, zirconia fibers, non-oxide ceramic fibers, carbon fibers and mixtures thereof.

* * * * *

UNITED STATES PATENT AND TRADEMARK OFFICE
CERTIFICATE OF CORRECTION

PATENT NO. : 5,049,324                    Page 1 of 2

DATED : September 17, 1991

INVENTOR(S) : Jeffrey R. Morris and William E. Meinking

It is certified that error appears in the above-identified patent and that said Letters Patent is hereby corrected as shown below:

Title page, under References Cited U.S. PATENT DOCUMENTS
"3,451,841 6/1969 Keston et al. 428/312.8" should read
--3,451,841 6/1969 Kesten et al. 428/312.8--.
Title page
and FOREIGN PATENT DOCUMENTS
"0195076 10/1985 Japan 264/44" should read
--0195073 10/1985 Japan 264/44--.

Column 1 Line 28 delete "patent".

Column 3 Line 64   Page 6 Line 9 "$Al_2O_3 \cdot xSiO_2$"
should read --$Al_2O_3 \cdot x SiO_2$--.

Column 4 Line 1 delete "TABLE IV" (first occurrence).

Claim 3 Line 39 Column 5 "equalized" should read --equiaxed--.

UNITED STATES PATENT AND TRADEMARK OFFICE
CERTIFICATE OF CORRECTION

PATENT NO. : 5,049,324

DATED : September 17, 1991

INVENTOR(S) : Jeffrey R. Morris and William E. Meinking

It is certified that error appears in the above-identified patent and that said Letters Patent is hereby corrected as shown below:

Claim 9 Line 17 Column 6 "fiber-filled" should read --fiber filled--.

Claim 10 Line 22 Column 6 "sad" should read --said--.

Claim 10 Line 23 Column 6 "10 cm" should read --10cm--.

Claim 13 Line 33 Column 6 "11" should read --1--.

Claim 14 Line 36 Column 6 "11" should read --1--.

Signed and Sealed this

Fifteenth Day of June, 1993

Attest:

MICHAEL K. KIRK

*Attesting Officer*   *Acting Commissioner of Patents and Trademarks*